United States Patent [19]
Pearson

[11] 3,723,843
[45] Mar. 27, 1973

[54] ELECTRICAL BRAKING FOR A D.C. SERVO MOTOR CONTROL CIRCUIT

[75] Inventor: Samuel Reader Pearson, Farmers Branch, Tex.

[73] Assignee: Texas Instruments Incoporated, Dallas, Tex.

[22] Filed: Jan. 5, 1971

[21] Appl. No.: 103,967

[52] U.S. Cl. ............... 318/612, 318/594, 318/374, 318/375, 318/467
[51] Int. Cl. ............................................. G05b 5/01
[58] Field of Search......318/594, 612, 613, 616, 331, 318/374, 375, 467

[56] References Cited

UNITED STATES PATENTS

| | | | |
|---|---|---|---|
| 3,037,157 | 5/1962 | Young | 318/331 X |
| 3,541,418 | 11/1970 | Agin et al. | 318/612 |

OTHER PUBLICATIONS

IBM Tech. Disclosure, Vol. 11, No. 12, May 1969, pg. 1697, G. J. Agin.

Primary Examiner—T. E. Lynch
Attorney—James O. Dixon, Andrew M. Hassell, Harold Levine, Melvin Sharp, Michael A. Sileo, Jr., Henry T. Olsen, Gary C. Honeycutt, Richard L. Donaldson and John E. Vandigriff

[57] ABSTRACT

A circuit is disclosed for controlling operation of a DC shunt field motor that is utilized to drive a variable load, and stop the motor so that the load is accurately positioned at a preselected location. Logic circuitry controls the motor speed to a regulated low speed when the load approaches the desired location. An integrator circuit controls application of dynamic braking to stop the motor when the load is correctly located.

8 Claims, 1 Drawing Figure

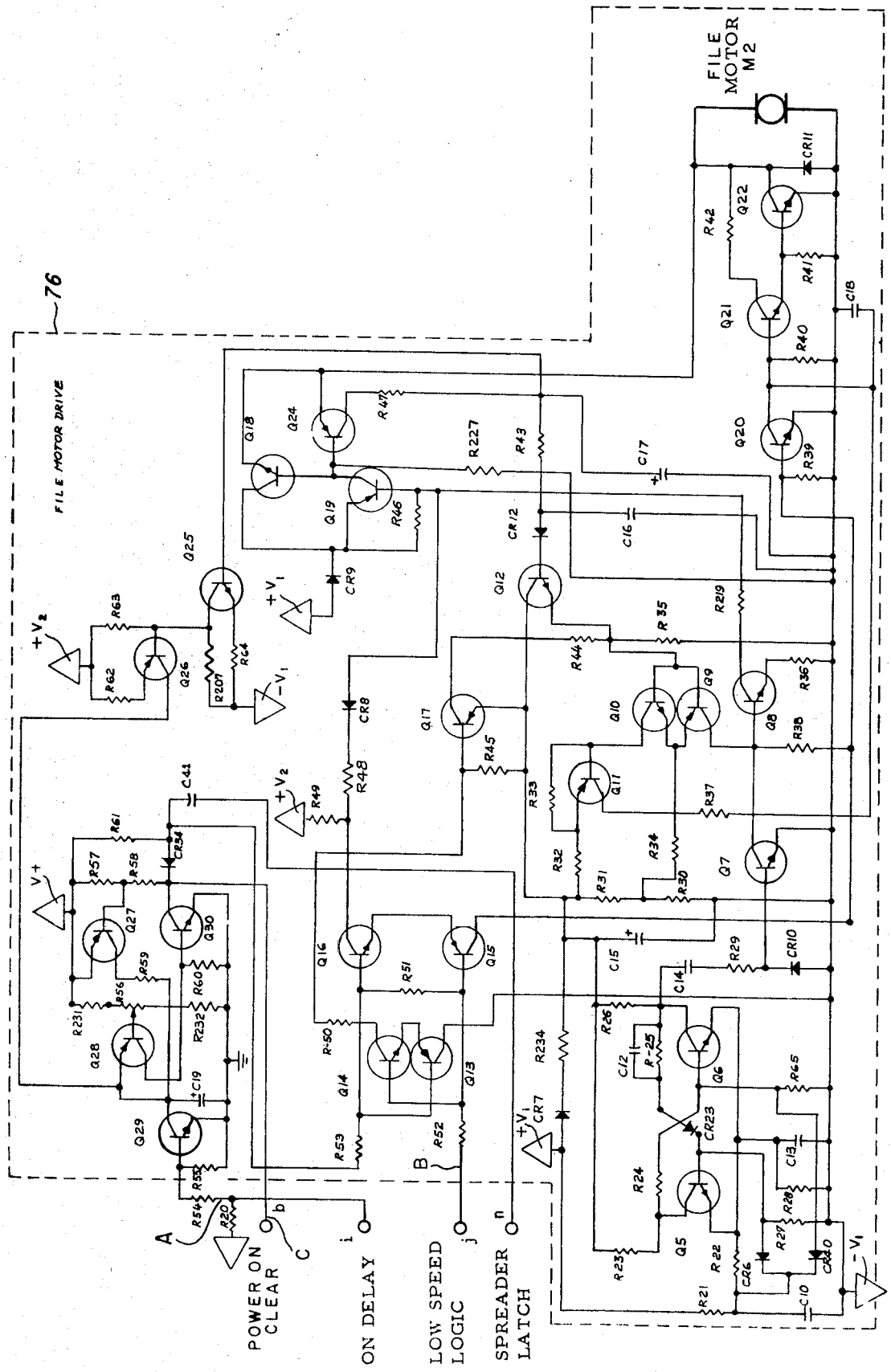

ELECTRICAL BRAKING FOR A D.C. SERVO MOTOR CONTROL CIRCUIT

BACKGROUND INFORMATION AND SUMMARY OF INVENTION

This invention pertains in general to high speed positioning systems and, more particularly, to a motor control circuit for a DC shunt field motor.

Various applications in industry require high speed positioning means for accurately positioning a load having a variable inertia and mechanical resistance. In some environments, it is desirable to effect the positioning without utilizing servo-type feedback systems. One technique that has been proposed to accomplish this uses a DC shunt field motor. A regulated voltage is applied to the motor to slow its speed prior to applying dynamic braking to stop the load. A major disadvantage with this technique is the fact that the speed of motor operation is a function of the load mechanical resistance. Thus, when dynamic braking is applied to stop the load, accurate positioning of the load is difficult since the final position is influenced by both the inertia and mechanical resistance of the load.

The requirement for a high speed positioning system that accurately locates a load having a variable mechanical resistance is particularly acute in automatic data retrieval and display systems of the type that are comprised of a desk top, self-contained microfische file reader. A rotary storage file provides microfische storage for the internal file of the system. When it is desired to view a preselected microfische, the code of that microfische is entered via a keyboard and a view button is activated to initiate a view cycle. Electromechanical relays and logic circuitry are thereby activated to control operation of the file so that the desired microfische may be selected. When the desired microfische is rotated to a position adjacent to the display means, additional circuitry is activated to apply dynamic braking and stop the file such that the desired microfische is accurately located at a predetermined position, spread the microfische apart so that the desired microfische is exposed for easy access, and to automatically position the microfische to an index display position. Each microfische, for example, may have 98 separate frames of microfilm. The index position catalogues the contents of the other 97 frames. From this index, the user can select the frame he wishes to view and enter the coordinate location of that frame via a second keyboard to control servo motors that position the microfische so that the desired frame is displayed.

In the above-described display system, a DC motor control circuit is required to rotate the rotary file at a maximum speed until the desired microfische is selected, slow the rotary file to a regulated speed and then accurately stop the rotary file so the selected microfische may be retrieved. Inasmuch as the load (mechanical resistance) of the file varies depending upon the number of microfische stored therein, it is difficult to accurately stop the file at a preselected location.

Accordingly, an object of the present invention is to provide a high speed motor control circuit that accurately positions a load having variable mechanical resistance.

A further object of the present invention is to provide a circuit for variably controlling the speed of a DC shunt field motor to accurately position an object to a preselected location with maximum speed.

Briefly and in accordance with the present invention, a DC motor controller circuit is provided. Three main sections are utilized in the circuit; a logic and control section, a regulated drive section, and an integrator section. When full wave rectified 60 $H_z$ drive is utilized, the time required for motor time constants may be too long for 120 $H_z$ sampling, and it may be desirable to utilize a multivibrator section to effectively reduce the cycle time to 60 $H_z$. The logic and control system controls operation of the motor for full speed, regulated speed or programmed stop. When full speed operation is desired, the control means enable application of maximum drive power. When regulated speed is required, the control means effect immediate dynamic braking. Regulator means sense the actual motor speed during low voltage phases of the drive power and apply the appropriate drive power during high voltage phases to maintain a preselected regulated low speed.

Responsive to a stop signal from the logic and control means, the speed integrator section converts the motor speed signal from the regulator means to distance using a voltage to current converter. The integrator means control application of dynamic braking to ensure the motor is accurately stopped at the desired location.

Novel features believed to be characteristic of this invention are set forth in the appended claims. The invention itself, however, as well as other objects and advantages thereof may best be understood when read in conjunction with the following detailed description of an illustrative embodiment by reference to the accompanying drawing which schematically depicts the DC motor control circuit of the present invention.

DETAILED DESCRIPTION

The DC motor control circuit and operation thereof will first be described. An illustrative embodiment of the invention as it functions in an automatic data retrieval and display system will then be described. It is to be appreciated, of course, that the circuit of the present invention may be utilized whenever it is desired to switch a DC shunt field motor from high speed operation to a regulated low speed and then stop the motor at a precise position.

With reference now to the FIGURE, operation of the DC motor control circuit will be described. The DC motor drive circuit may be separated generally into four functions or modes of operation: (1) full speed, (2) regulated low speed, (3) regulated low speed delay, and (4) stop. Inputs at terminals A and B control the mode of operation as follows:

When input A is at logic 1 and input B is at logic 0, maximum drive power is applied to the motor. When both inputs are at logic 1, the motor is controlled to operate at a regulated low speed. When input A goes to logic 0, and input B remains at logic 1, the circuit operates in the delay mode and measures a predetermined distance of motor rotation, after which the circuit operates in the stop mode.

When input A is a 1 and input B is a 0, maximum drive power is applied by the drive circuitry. The positive input at A is conducted through resistor R54 to the base of npn transistor Q29. This saturates Q29 reducing the voltage across capacitor C19 to a value at or near ground potential, thus biasing pnp transistor Q28 off, which in turn biases npn transistor Q30 off effecting a DC voltage (+V) or logic 1 at the collector of Q30 and the junction of resistor R61 and diode CR34. The positive voltage of logic 1 at the collector of Q30 is conducted through resistor R53 to the base of npn transistor Q16. In addition, a signal is provided at the output C to indicate that the DC motor M1 is receiving drive power. Since input A is more positive than input B, and since resistors R53, R52 and R51, transistors Q16, Q15, Q13 and Q14 operate as a DC isolator, Q15 and Q16 will turn on providing drive through resistor R48 and diode CR8 to the base of pnp transistor Q19 and npn transistor Q18. This drive saturates transistor Q18 and provides maximum +V$_1$ drive to the DC motor M1. For a more detailed description of the DC isolator, reference copending application Ser. No. 103,965, filed 1-5-71, entitled "DC Isolator Circuit", filed concurrently herewith and assigned to the same assignee. At each cycle of the plus and minus power supplies, +V$_1$ and −V$_1$, pnp transistor Q24 will saturate through the action of resistor R227 which is connected to the minus power supply. This causes a voltage proportional to the motor speed to be stored in capacitors C17 and C16. An enable signal may be provided at input D to control drive through resistor R53.

When input B also goes to a logic 1, a regulated slow speed mode of operation results. The bases of transistors Q15 and Q16 assume similar potentials and, as a consequence, turn off, thereby removing maximum drive from the motor. At the next cycle of drive power, npn transistor Q12, which is connected in an emitter-follower configuration, couples the voltage of capacitor C16 (which represents actual motor speed) to the junction of resistors R44 and R35 and also to the base of npn transistor Q10 and pnp transistor Q9. Resistors R31 and R30 provide a voltage potential which represents the desired regulated low speed. This potential is monitored when the plus power supply and the minus power supply are at maximum voltage. When the desired low speed voltage potential is generated, it is compared with the voltage potential at the junction of resistors R44 and R35 to determine whether actual motor speed is greater than, less than, or equal to the desired regulated low speed. Assume that the actual motor speed is greater than the desired regulated low speed. This will cause transistor Q10 to turn on (since the base-emitter is forward biased) providing drive to the base of pnp transistor Q11. Thus, transistor Q11 is biased on and provides drive to the base of npn transistors Q21 and Q22 through resistor R37. This effects maximum braking using the dynamic characteristics of the DC shunt field motor M1. This process is repeated during subsequent cycles of the plus and minus power supply until such time as the voltage reflected at the juncture of resistors R44 and R35 is similar to the voltage reflected at the juncture of resistors R31 and R30, indicating that the motor speed is at the desired value. Subsequent reduction in the motor speed due to load, braking, etc. will cause the potential at the junction of R44 and R35 to be lower than the potential at resistors R30 and R31. When this occurs, the positive potential as seen at the juncture of R31 and R30 will be conducted through resistor R34 to the emitter of pnp transistor Q9. The potential at the base of Q9 will be slightly less than the potential at the emitter and therefore Q9 will turn on and provide drive for npn transistor Q8 which will in turn provide drive through resistor R219 to pnp transistor Q19. This drive will be proportional to the difference between the actual speed and the desired motor speed. As a consequence, when the motor speed falls below the desired speed, motor drive will occur. Throughout the operation of the motor speed regulator, when the positive power supply goes to 0, transistor Q24 saturates supplying the voltage generated by the motor to capacitors C17 and C16 such that these two capacitors always maintain a representation of the actual motor speed. As may be seen, regardless of the mechanical resistance of the load being driven by the motor, the speed of the motor is accurately regulated.

A logic zero at input A is coupled through resistor R54 to the base of Q29 to initiate a programmed stop of the motor at a precise location. The logic zero biases Q29 to the off condition. The voltage representative of actual motor speed, as seen on capacitor C17, is applied to the base of NPN transistor Q25. Transistor Q25 and resistor R64 provide a voltage to current convertor. Increases in the voltage on the base of Q25 provide increases in the voltage on the emitter and, consequently, an increase in current through R64. Since emitter current is approximately equal to collector current, the current through the collector is a function of the voltage on the base. Resistor R207 provides an increase in the collector current as a function of an increase in the power supply voltage, effecting a slightly higher representation of motor speed for higher power supply values. Transistor Q26 and resistors R62 and R63 provide an additional current to voltage conversion stage. Resistor R63 converts the current from transistor Q25 to a voltage and resistor R62 converts this voltage back to a current. The reason for using this subsequent stage is to amplify the voltage and current levels for more effective operation with transistor Q29, capacitor C19 and transistor Q28. The current from transistor Q26 is applied to capacitor C19 so that the voltage on C19 is the integral of the current. Since current is proportional to motor speed, the voltage on C19 is proportional to the integral of motor speed or in other words, distance of motor rotation. After a predetermined delay or motor rotation, the voltage at C19 increases to a value larger than the voltage at the wiper of potentiometer R56, biasing transistor Q28 on and subsequently turning on NPN transistor Q30. As Q30 turns on, a logic 0 will be seen at resistor R53. Assuming a logic 1 is still reflected at input B, transistors Q13 and Q14 will saturate. This will provide drive through resistor R50 to PNP transistor Q17. This will saturate transistor Q17 which will simultaneously provide drive for transistors Q10 and Q11. This is accomplished by the collector of Q17 supplying drive through resistor R44 to the base of Q10 and the emitter of Q17 supplying drive through resistor R32 to the base of Q11. Transistor Q11 is saturated and provides drive through resistor R37 to NPN transistor Q21 and therefrom to transistor Q22. This will provide maximum braking of the motor and an immediate stop.

The operation of NPN transistor Q20 is to prevent any possibility of dynamic braking during full speed operation. During full speed operation, transistors Q15 and Q16 are saturated. This enables transistor Q20 to become saturated and thereby prevents any input from occuring at transistor Q21.

Transistors Q5 and Q6 and associated circuitry provide a conventional multivibrator. The operation of the multivibrator is to divide the 120Hz frequency occuring on the power supply and provide an input to transistor Q7. The effect of the multivibrator is to enable transistor Q8 to drive the motor only on alternate cycles. This ensures that sufficient time is available for transistor Q24 to supply a voltage representing the speed of the motor to capacitor C17. Otherwise, the motor time constants may impede proper operation of the circuit.

In the data retrieval and display systems previously described in general and described in more detail hereinafter, the DC motor control circuit of the present invention may be utilized to control operation of the rotary storage file. The control circuit would operate the rotary file at maximum speed until a desired microfische was selected. The rotary file would then be stopped so that the desired microfische was accurately located in a preselected position for retrieval.

A more detailed description of the data retrieval and display system above described and circuits that may be utilized therein may be found in copending application Ser. No. 104,038, filed 1-5-71, entitled "Automatic Data Retrieval and Display System", filed concurrently herewith and assigned to the same Assignee.

An illustrative embodiment of the DC Motor Control circuit of the present invention has been described herein. It will be appreciated, however, by a person skilled in the art that various modifications to the details of construction may be made without departing from the scope of the invention.

What is claimed is:

1. A d.c. motor control circuit for driving a motor at selectable speeds and stopping the motor at a precise position comprising in combination:
   a. logic input means for controlling operation of said d.c. motor;
   b. sources of plus and minus full wave rectified unfiltered drive power;
   c. circuit means for connecting said drive power to said motor in response to a first logic signal at said input means for driving said motor at maximum speed;
   d. speed regulator means responsive to a second logic signal at said input means for driving said motor at preselected low speed; and
   e. integrator means responsive to a third logic signal at said input means for converting motor speed into motor rotation distance, said integrator means controlling the time at which dynamic braking is applied to said d.c. motor to stop motor operation at a precise predetermined position.

2. A D.C. motor control circuit as set forth in claim 1 wherein said speed regulator means comprises:
   a. speed sensing means for providing a first voltage proportional to the actual speed of said motor during low voltage portions of said drive power; and
   b. detection means for comparing said first voltage with a second voltage proportional to a preselected low speed, said detection means selectively applying power for dynamic braking action as required to regulate the speed of said motor to correspond with said preselected speed.

3. A d.c. motor control circuit as set forth in claim 2 wherein said speed sensing means comprises a transistor and at least one capacitor connected in series across the armature of said motor, the base of said transistor being electrically connected to one terminal of said armature by resistor means, the emitter of said transistor being connected to the other terminal of said armature and the collector being coupled to said one terminal by capacitor means wherein said transistor is biased into conduction by said resistor means during low voltage portions of said drive power, said capacitor means being operative to store said first voltage proportional to the actual motor speed.

4. A d.c. motor control circuit as set forth in claim 2 wherein said detection means comprises means for generating said second voltage proporational to said preselected low speed and transistor means for comparing the amplitude of said first and second voltages, said transistor means effecting operation of dynamic braking means when said first voltage is larger and applying drive power to said motor when said second voltage is larger.

5. A d.c. motor control circuit as set forth in claim 4 wherein said means for generating said second voltage comprises a voltage divider resistor circuit connected across said negative and positive power supplies.

6. A d.c. motor control circuit as set forth in claim 4 wherein said dynamic braking means comprise a transistor connected directly across the armature of said d.c. motor, said transistor when biased on effectively shunting the armature of said motor to effect dynamic braking thereof.

7. A d.c. motor control circuit as set forth in claim 1 wherein said integrator means comprises in combination a voltage to current conversion circuit, said circuit converting a voltage proportional to actual motor speed into a current proportional to actual motor speed, and capacitor means for storing said current, the voltage of said capacitor means effectively representing the integral of said current, said capacitor voltage being proportional to distance of rotation of said motor and being operable to provide an enable signal to effect dynamic braking after a predetermined distance of motor rotation to thereby accurately stop said motor rotation at a precise predetermined location.

8. A motor control circuit as set forth in claim 7 wherein said voltage to current converter comprises a transistor and resistor circuit, a voltage proportional to actual motor speed being applied to the base of said transistor to vary the current flowing through said resistor in proportion to the amplitude of said voltage.

\* \* \* \* \*